(12) United States Patent
Zadesky et al.

(10) Patent No.: US 8,375,767 B2
(45) Date of Patent: *Feb. 19, 2013

(54) MOUNTED SHOCK SENSOR

(75) Inventors: Stephen P. Zadesky, Portola Valley, CA (US); Fletcher R. Rothkopf, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,832

(22) Filed: Jan. 7, 2011

(65) Prior Publication Data

US 2011/0100124 A1  May 5, 2011

Related U.S. Application Data

(60) Continuation of application No. 12/428,257, filed on Apr. 22, 2009, now Pat. No. 7,886,573, which is a division of application No. 11/725,008, filed on Mar. 15, 2007, now Pat. No. 7,541,939.

(51) Int. Cl.
*G01M 7/00* (2006.01)
(52) U.S. Cl. ...................................................... 73/12.01
(58) Field of Classification Search ................... 73/12.01
See application file for complete search history.

(56) References Cited

U.S. PATENT DOCUMENTS

| | | | |
|---|---|---|---|
| 3,906,802 A | 9/1975 | Nonaka et al. | |
| 4,683,355 A | 7/1987 | Bitko | |
| 4,967,598 A | 11/1990 | Wakatsuki et al. | |
| 5,248,861 A | 9/1993 | Kato et al. | |
| 5,623,248 A | 4/1997 | Min | |
| 5,627,315 A | 5/1997 | Figi et al. | |
| 5,801,348 A | 9/1998 | Asada | |
| 6,142,007 A | 11/2000 | Yuze et al. | |
| 6,335,498 B1 | 1/2002 | James et al. | |
| 7,219,549 B2 | 5/2007 | Honkura et al. | |
| 7,458,266 B2 * | 12/2008 | Beard et al. | 73/579 |
| 7,541,939 B2 * | 6/2009 | Zadesky et al. | 340/635 |
| 7,886,573 B2 * | 2/2011 | Zadesky et al. | 73/12.01 |

* cited by examiner

*Primary Examiner* — Lisa Caputo
*Assistant Examiner* — Octavia Davis-Hollington
(74) *Attorney, Agent, or Firm* — Womble Carlyle Sandridge & Rice LLP

(57) ABSTRACT

This application is directed to a shock sensor mounted in an electronic device. The shock sensor includes both active and passive shock detection methods that allow a technician to determine whether the electronic device was subjected to a shock event that exceeded an impact threshold level. The shock sensor may include shock detection contacts that form an electrical circuit that remains open in the absence of a shock event that exceeds an impact threshold level. In response to a significant shock event, a movable component or substance of the shock sensor may move from a first position to a second position, thereby closing the electrical circuit formed by the shock detection contacts. The change in circuit may be detected and used to provide active indication of whether the electronic device has been subjected to a substantial shock event. In addition, the shock sensor may be observed to passively determine whether the electronic device has been subjected to a substantial shock event.

20 Claims, 7 Drawing Sheets

MOUNTED SHOCK SENSOR

CROSS-REFERENCE TO RELATED APPLICATION

This application is a continuation of copending, commonly-assigned U.S. patent application Ser. No. 12/428,257, filed Apr. 22, 2009, which is a divisional of U.S. Pat. No. 7,541,939, issued Jun. 2, 2009, which is fully incorporated by reference herein in its entirety.

BACKGROUND OF THE INVENTION

This invention is directed to a shock sensor mounted in an electronic device.

Some electronic devices are provided with shock sensors to determine the level of shock events to which the electronic device is subjected over the course of its lifetime. In some cases, the shock sensors may be used for warranty purposes (e.g., the warranty is invalid if the electronic device is subjected to a shock event that exceeded the shock event of a 10 foot drop). Shock sensors can be classified in two categories: active shock sensors and passive shock sensors.

Active shock sensors can include an accelerometer configured to generate a signal when the accelerometer detects a level of acceleration that corresponds to an impact threshold level. The signal may then be read by detection circuitry without disassembling the electronic device.

An inherent limitation of some active shock sensors, such as those that include accelerometers, is that they require power to operate. This means that they consume power while the device operates, and will not function if the device fails (e.g., the device does not power up). In addition, adding an active shock sensor may require circuit board modifications. Furthermore, if the electronic device is severely damaged, the active sensor may be rendered inoperable or diagnostic equipment may not be able to obtain data from the sensor or storage medium containing shock sensing information. Finally, active shock sensors are relatively expensive, at least compared to various passive sensors.

Passive shock sensors typically include an ink capsule that is enclosed in a tube. The capsule is constructed such that it breaks when the electronic device is subjected to a shock event that exceeds an impact threshold level. When the capsule ruptures, the ink (or other colored liquid contained in the capsule) is released and fills the tube. A technician may then disassemble the electronic device and observe the shock sensor to determine, based on the location the ink in the shock sensor, whether the electronic device was subjected to a shock event that exceeded the impact threshold level.

While passive shock sensors do not exhibit some of the limitations of active shock sensors, they are generally not resettable. This requires the shock sensor to be replaced when the electronic device is repaired or refurbished. In addition, there is typically no method for observing the shock sensor from the outside of the electronic device. Instead, the technician must disassemble the device to access the shock sensor.

Accordingly, it would be desirable to provide a shock sensor that exhibits both active and passive attributes. In particular, it would be desirable to provide a shock sensor that can be analyzed without disassembling the device. It would also be desirable to provide a shock sensor that can be analyzed when the device has failed and electronic detection is not possible.

SUMMARY OF THE INVENTION

A shock sensor by which shock events can be analyzed without disassembling the device is provided. A shock sensor by which shock events can be analyzed when the device has failed is also provided. The shock sensor provides both active and passive attributes for a technician to analyze the shock events endured by an electronic device.

In accordance with some embodiments of the invention, a shock sensor that includes shock detection circuitry is provided. The shock detection circuitry may include one or more shock detection contacts (e.g., a wire) that may be electrically coupled to the shock sensor such that in the absence of a significant enough shock event, no signal is provided to indicate the occurrence of a shock event. Signal detection can be performed by a diagnostic device that interfaces (e.g., connects to a docking port) with the assembled electronic device so that a technician can check the shock event status without disassembling the electronic device.

Different mechanisms may be used to provide an electrical signal in response to a shock event that exceeds the impact threshold level. Generally, a movable component or substance may be configured to move from a first position in which the shock detection contacts form an open electrical circuit to a second position in which the movable component or substance closes the electrical circuit formed by the shock detection contacts to provide an electrical signal.

In one embodiment, shock detection contacts may be inserted in a chamber at a predetermined distance from each other. A reservoir (e.g., similar to an ink capsule) containing a conductive fluid can be enclosed within the chamber. When a shock event exceeds the impact threshold level, the reservoir may rupture and release the conductive fluid in the chamber. The conductive fluid may then short the shock detection contacts extending into the chamber. Detection circuitry may provide an electrical signal in response to the short circuit.

In some embodiments, the conductive fluid may also serve as a passive shock sensor. If a diagnostic device is not able to detect an electrical signal, the electronic device may be disassembled to observe the shock sensor. If the conductive fluid is in the chamber and not restrained in the reservoir, the shock sensor passively indicates whether a shock event was experienced that exceeded the impact threshold level. The conductive fluid may be colored to allow easier passive shock detection.

In another embodiment, a cantilever spring may be electrically coupled to a first shock detection contact. A second shock detection contact may be electrically coupled to a chamber that encloses the free end of the cantilever spring (e.g., a tube or an open box). In response to a shock event that exceeds the impact threshold level, the cantilever spring bends, and the free end of the cantilever spring comes into contact with the chamber and shorts the first and second shock detection contacts.

The free end of the cantilever spring may include a magnet, and the chamber may be constructed from magnetically reactive material such that when a shock event exceeds the impact threshold level, the magnet of the cantilever comes into and remains in contact with the chamber by magnetic attraction, thereby closing the electrical circuit. The position of the cantilever and magnet provides a method for passively determining whether a shock event on the electronic device exceeded the threshold. A technician can disassemble the electronic device and observe the location of the magnet within the chamber. If the magnet is in contact with the chamber, the shock sensor passively indicates a shock event that exceeded the impact threshold level.

The shock sensor can be reset using a tool to decouple the magnet from the chamber. Once the magnet is returned to an equilibrium position between the walls of the chamber, and the effect of the electrical signal removed (e.g., reset a bit in memory), the shock sensor can be re-used in the electronic device.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

In accordance with the present invention, a shock sensor that exhibit attributes of both active shock sensors and passive shock sensors is provided.

Figure 1:
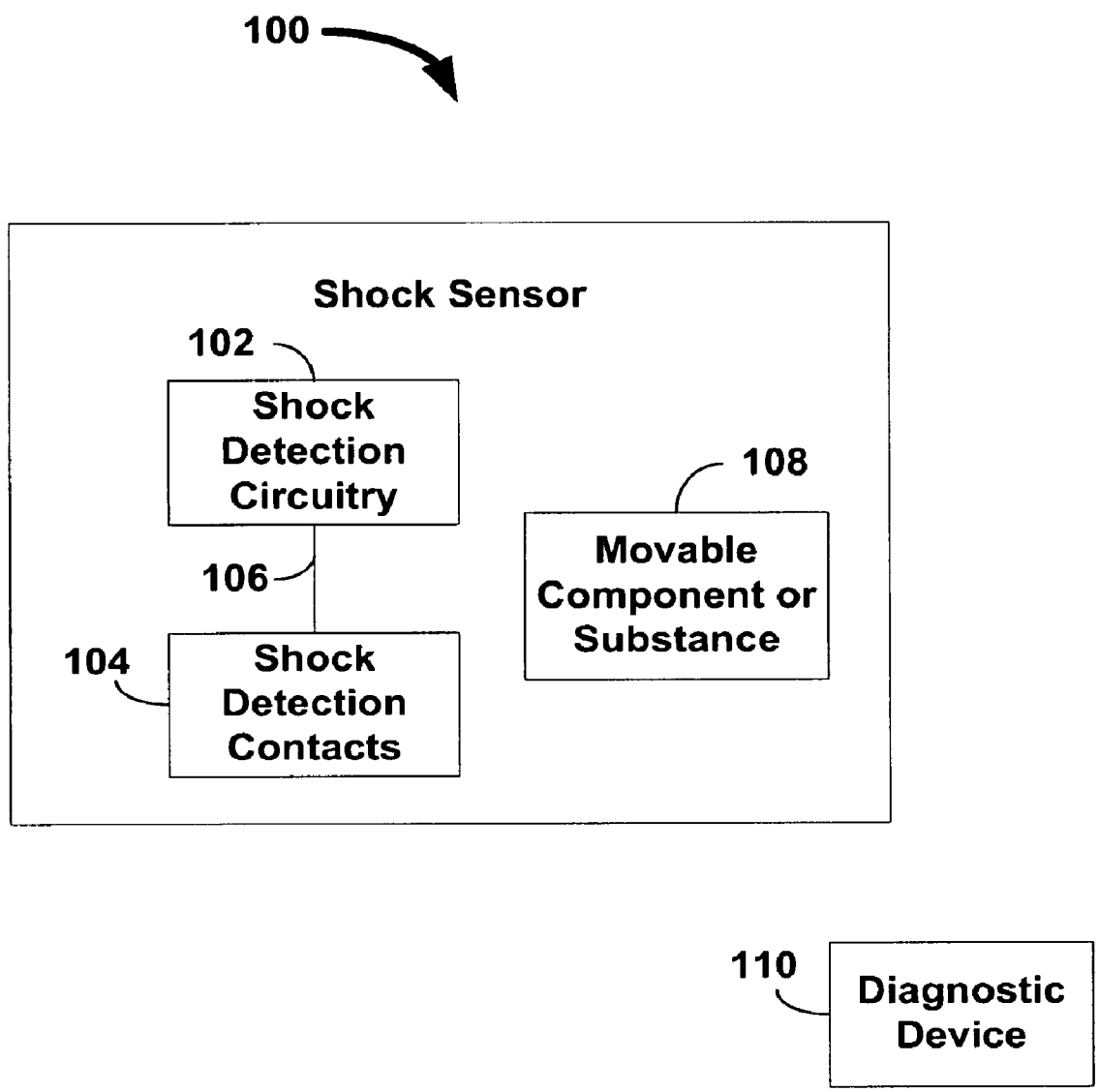
FIG. 1 is a schematic view of an illustrative shock sensor system that includes both active and passive attributes in accordance with one embodiment of the present invention.

FIG. 1 is a schematic view of an illustrative shock sensor that includes both active and passive attributes. Shock sensor 100 may include shock detection circuitry 102 configured to provide an electrical signal when the shock sensor is subjected to a shock event that exceeds the impact threshold level of the shock sensor. Shock detection circuitry 102 may be electrically coupled to one or more shock detection contacts 104 by conductive connection 106. Shock detection contacts 104 may include, for example, a wire, a conductive plate, a conductive region, or any other suitable contact. Conductive connection 106 can include any suitable connection that conducts electricity between shock detection circuitry 102 and shock detection contacts 104 (e.g., a wire).

Shock detection contacts 104 and shock detection circuitry 102 may be configured to form an electrical circuit that is open in the absence of a shock event that exceeds the impact threshold level of shock sensor 100. So long as the electrical circuit remains open, shock detection circuitry may be configured not to provide an electrical signal (or at least a signal that does not indicate that the impact threshold has been exceeded). For example, shock detection contacts 104 may include at least two wires that are maintained at a distance from each other without an electrical coupling. When shock sensor 100 is subjected to a sufficiently large shock event, the state of shock sensor 100 may be changed such that the wires become electrically coupled and the electrical circuit formed by shock detection contacts 104 and shock detection circuitry 102 may be closed.

Shock sensor 100 may include movable component or substance 108. Movable component or substance 108 may be configured to move from a first position to a second position in response to a shock event that exceeds the impact threshold level of shock sensor 100. In the first position, movable component or substance 108 may be configured to maintain electrical isolation between shock detection contacts 104. In the second position, movable component or substance 108 may be configured to short shock detection contacts 104 such that the electrical circuit formed by shock detection contacts 104 and shock detection circuitry 102 may be closed. In addition, the first and second positions of movable component or substance 108 may be observably different such that a technician, observing shock sensor 100, may identify the position of movable component or substance 108 and passively detect shock events. The impact threshold level of shock sensor 100 may be determined by the level of the shock event necessary to cause movable component or substance 108 to move from the first position to the second position.

In response to a shock event that causes movable component or substance 108 to short shock detection contacts 104, shock detection circuitry 102 detects the short circuit. In response to detecting the short circuit, shock detection circuitry 102 may be configured to provide an electrical signal identifying the shock event. In some embodiments, shock detection circuitry 102 may continuously or intermittently provide an electrical signal available for detection. In some embodiments, shock detection circuitry 102 may provide an electrical signal that causes the state of shock sensor 100 to be modified. For example, the electrical signal may cause one or more bits in memory of shock detection circuitry 102, or in another component of shock sensor 100 (e.g., an RFID tag) to change. In some embodiments, shock detection circuitry 102 may provide an electrical signal that causes the state of the electronic device in which shock sensor 100 is implemented to be modified. For example, the electrical signal may cause one or more bits in the memory of the electronic device to be modified. Shock sensor 100 may use one or more of these approaches (e.g., transmit a signal at different intervals based on the state change of shock sensor 100 or of the electronic device).

Detection circuitry 102 may be configured to detect momentary short circuits. Based on the duration of the short circuit, detection circuitry 102 may ignore or process the short circuit. For example, a short circuit that is detected for a very short duration may be processed as a short circuit that occurred because the device was subjected to a substantial shock event and immediately failed. As another example, a short circuit that is detected for a longer duration may be processed as a false positive caused by a temporary displacement of movable component or substance 108 from the first position to the second position. The windows for interpreting the duration of short circuits may be selected in any suitable manner, for example using empirical data. In some embodiments, shock detection circuitry 102 may interface with a processor of the electronic device before interpreting a short circuit (e.g., to determine whether the electronic device has failed).

In some embodiments, shock detection circuitry 102 may be incorporated in the electronic device in which shock sensor 100 is implemented. For example, shock detection circuitry 102 may be incorporated in the processor of the electronic device. In such embodiments, the electrical signal provided by shock detection circuitry 102 may be configured to modify the state of the electronic device instead of the state of shock sensor 100.

Shock sensor 100 may be electrically coupled to the electronic device in any suitable manner. In some embodiments, shock sensor 100 may be soldered to a circuit board of the electronic device in which shock sensor 100 is implemented. Soldering shock sensor 100 directly to the circuit board provides an easy, repeatable, and reliable method for coupling shock sensor 100 to the circuit board. Effectively, the shock sensor may simply become another element that is assembled to the electronic device's circuit board. In some embodiments, shock detection circuitry 102, shock detection contacts 104, or both may be soldered to a circuit board of the electronic device.

To determine whether shock sensor 100 was subject to a shock event even that exceeded the impact threshold level, a technician may use two approaches. A first approach may be to detect the electrical signal provided by shock detection circuitry 102 or to detect the effect of the electrical signal provided by shock detection circuitry 102. To detect the electronic signal or the electronic signal's effect, a technician may use diagnostic device 110. For example, in embodiments in which shock detection circuitry 102 continually transmits an electrical signal, the technician may couple diagnostic device 110 to shock detection circuitry 102 and detect the impedance, voltage, or current provided by detection circuitry 102. As another example, if the electronic signal modified the state of shock sensor 100 or of the electronic device, the diagnostic device may be configured to identify the state variable of shock sensor 100 or of the electronic device. Based on the value of the state variable, diagnostic device 110 may determine whether shock sensor 100 was subject to a shock event that exceeded the impact threshold level.

In some embodiments, the electronic device, shock sensor 100, or both may fail and prevent diagnostic device 110 from determining whether an electronic signal was provided by shock detection circuitry 102. For example, if shock sensor 100 does not have power, diagnostic device 110 cannot determine whether shock detection circuitry 102 would continuously transmit an electronic signal if power were available. As another example, if a shock event caused a complete failure of the electronic device, diagnostic device 110 cannot determine whether shock detection circuitry 102 attempted to modify the state of shock sensor 100 or of the electronic device.

When diagnostic device 110 cannot provide a conclusive answer as to whether shock sensor 100 endured a shock event exceeding the impact threshold level, the technician may observe movable component or substance 108. In some embodiments, the technician may be required to disassemble the electronic device in order to view shock sensor 100 and movable component or substance 108. If the technician observes that movable component or substance 108 is in the second position, the technician may conclude that shock sensor 100 was subject to a shock event that exceeded the impact threshold level. If instead, the technician observes that movable component or substance 108 is in the first position, the technician may conclude that shock sensor 100 was not subject to a shock event exceeding the impact threshold level.

In some embodiments, after determining that shock sensor 100 was subject to a shock event that exceeded the impact threshold level, and thus that movable component or substance 108 moved from the first position to the second position, the technician may reset shock sensor 100. To reset shock sensor 100, the technician may return movable component or substance 108 to the first position. In addition, the technician may reset the state of shock sensor 100 and of the electronic device, if necessary (e.g., reset one or more bits in memory). The technician may also reset shock detection circuitry 102 so that it does not provide a continuous electrical signal (indicating the occurrence of a shock event that exceeded the impact threshold level).

Figure 2:
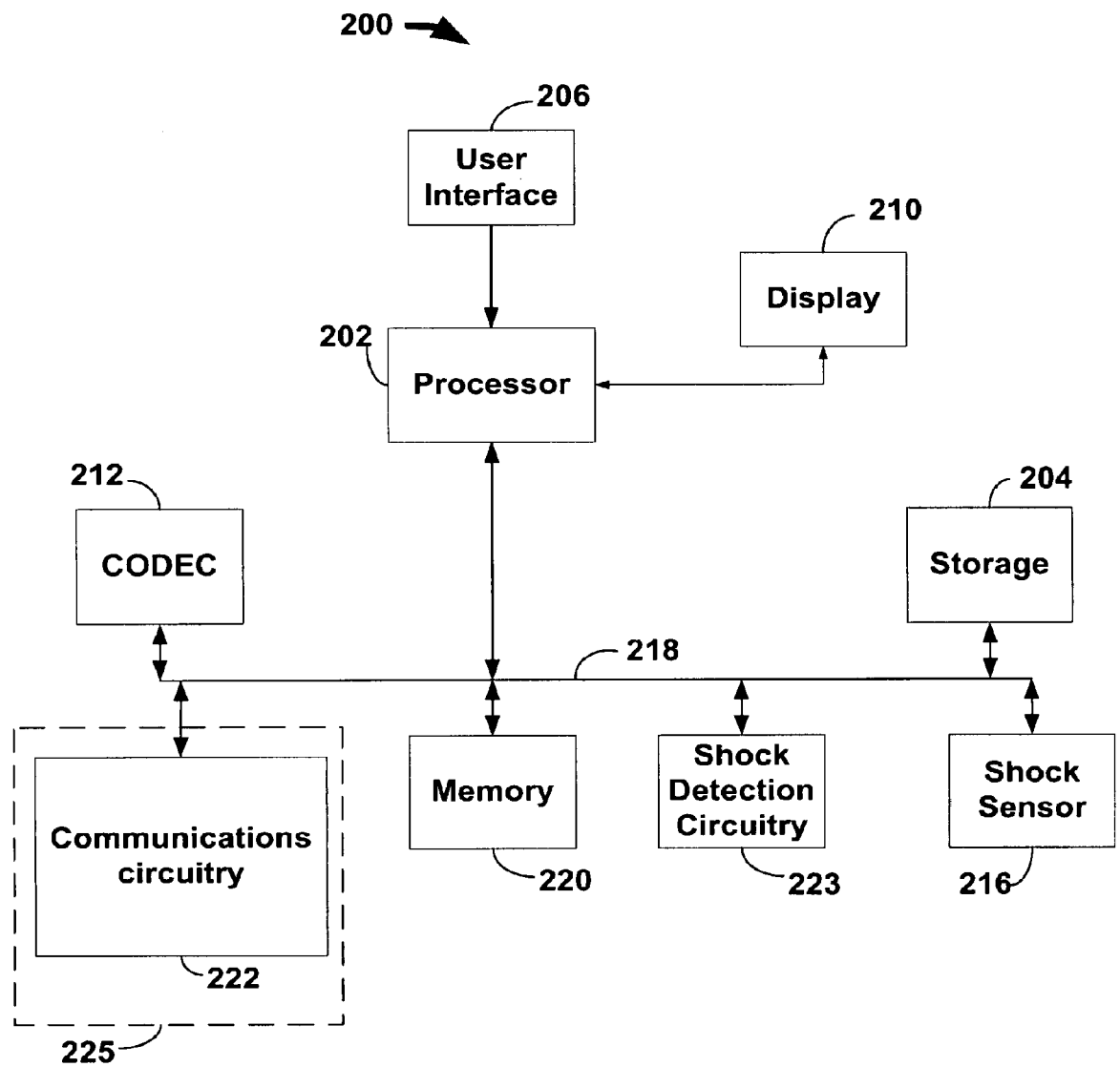
FIG. 2 is a schematic view of an illustrative device in which a shock sensor is implemented in accordance with one embodiment of the present invention.

FIG. 2 shows a simplified block diagram of illustrative portable electronic device 200 in which a shock sensor is implemented. Electronic device 200 may include processor 202, storage device 204, user interface 208, display 210, CODEC 212, shock sensor 216, bus 218, memory 220, communications circuitry 222, and shock detection circuitry 223. Processor 202 can control the operation of many functions and other circuitry included in electronic device 200. Processor 202 may drive display 210 and may receive user inputs from user interface 208.

Storage device 204 may store media (e.g., music and video files), software (e.g., for implementing functions on device 200, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device to establish a wireless connection such as a telephone connection), subscription information (e.g., information that keeps tracks of podcasts or television shows or other media a user subscribes to), telephone information (e.g., telephone numbers), shock event information (e.g., a history of shock events that exceed an impact threshold level), and any other suitable data. Storage device 204 may include one more storage mediums, including for example, a hard-drive, permanent memory such as ROM, semi-permanent memory such as RAM, or cache.

Memory 220 may include one or more different types of memory which may be used for performing device functions. For example, memory 220 may include cache, Flash, ROM, and/or RAM. Memory may be specifically dedicated to storing firmware. For example, memory may be provided for store firmware for device applications (e.g., operating system, user interface functions, and processor functions).

Shock sensor 216 may be provided for detecting shock events to which device 200 is subject in accordance with an embodiment of the present invention. Shock sensor 216 may communicate with other circuitry in device 200 directly (not shown in this FIG.) or indirectly via bus 218.

Shock detection circuitry 223 may be provided to monitor shock sensor 216. Shock detection circuitry 223 may be configured, in response to determining that shock sensor 216 was subject to a substantial shock event, to provide an electrical signal to processor 202, directing the processor to change the state of shock system 216 or device 200 (e.g., change one or more bits in storage 204 or memory 220). In some embodiments, shock detection circuitry may be configured to provide an electrical signal continuously or at least various intervals.

Bus 218 may provide a data transfer path for transferring data to, from, or between storage device 204, shock sensor 216, shock detection circuitry 213, communications circuitry 222, memory 220, and processor 202. Coder/decoder (CODEC) 212 may be included to convert digital audio signals into an analog signal, which may be provided to an output port (not shown).

Communications circuitry 222 may be included in a carrier circuitry portion (delimited by dashed lines 225) of device 200. Carrier circuitry portion 225 may be dedicated primarily to processing telephone functions and other wireless communications (e.g., Wi-Fi or Bluetooth). It is understood that the carrier circuitry portion operate independent of other device components operating in device 200. That is, carrier circuitry may be an independently operating subsystem within device 200 that may communicate with other components within device 200.

User interface 208 may allow a user to interact with the device 200. For example, the user input device 208 can take a variety of forms, such as a button, keypad, dial, a click wheel, or a touch screen. Communications circuitry 222 may include circuitry for wireless communication (e.g., short-range and/or long range communication). For example, the wireless communication circuitry may be Wi-Fi enabling circuitry that permits wireless communication according to one of the 802.11 standards or a private network. Other wireless network protocols standards could also be used, either in alternative to the identified protocols or in addition to the identified protocol. Another network standard may be Bluetooth.

Communications circuitry 222 may also include circuitry that enables device 200 to be electrically coupled to another device (e.g., a computer or an accessory device) and communicate with that other device. As indicated above, communications circuitry 222 may also include baseband circuitry for performing relatively long-range communications (e.g., telephone communications). If desired, communications circuitry 222 may include circuitry for supporting both relatively long-range and short-range communications. For example, communications circuitry 222 may support telephone, Wi-Fi, and Bluetooth communications.

In one embodiment, device 200 may be a portable computing device dedicated to processing media, such as audio and video. For example, device 200 may be a media player (e.g., MP3 player), a game player, a remote controller, a portable communication device, a remote ordering interface, an audio tour player, or other suitable personal device. In another embodiment, device 200 may be a portable device dedicated to providing media processing and telephone functionality in a single integrated unit. Device 200 may be battery-operated and highly portable so as to allow a user to listen to music, play games or video, record video or take pictures, place and take telephone calls, communicate with others, control other devices, and any combination thereof. In addition, device 200 may be sized such that it fits relatively easily into a pocket or hand of the user. By being handheld, device 200 is relatively small and easily handled and utilized by its user and thus may be taken practically anywhere the user travels.

FIGS. 3A, 3B, 4A and 4B describe illustrative shock sensors that include shock detection contacts and a movable component or substance that can be moved from a first position to a second position. These illustrative shock sensors will be described in more detail in the following discussion.

Figure 3A:
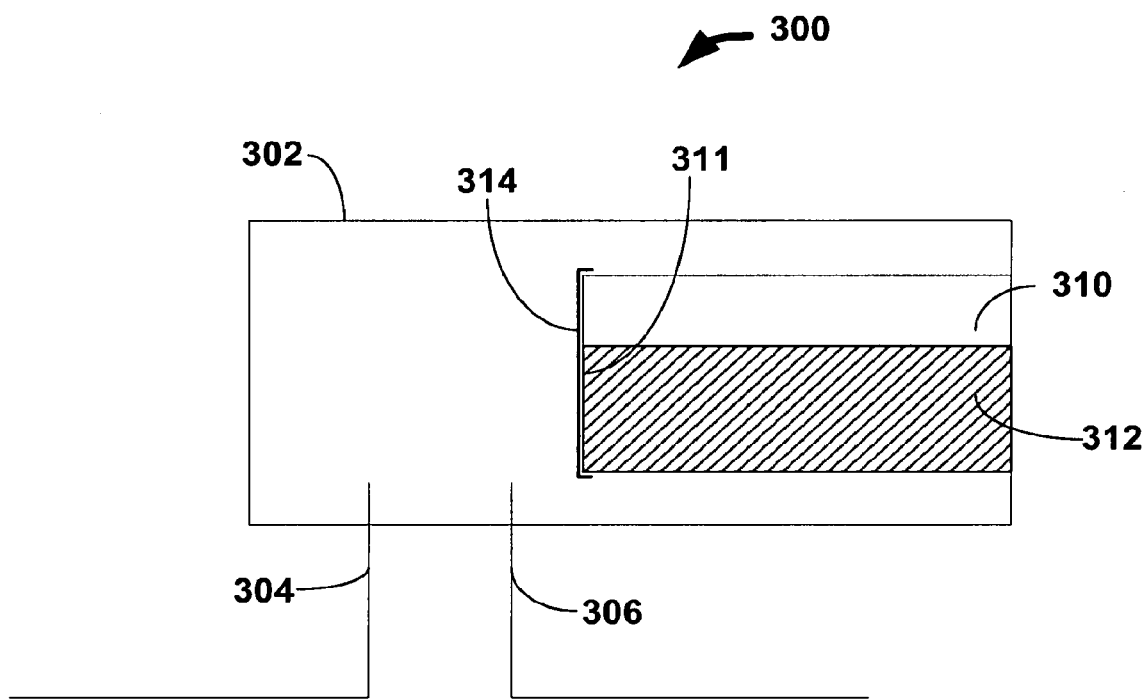
FIG. 3A is a simplified cross-sectional view of an illustrative shock sensor system that includes both active and passive attributes in accordance with one embodiment of the present invention.

FIG. 3A is a simplified cross-sectional view of an illustrative shock sensor system that includes both active and passive attributes. Sensor 300 includes chamber 302 that may be mounted in an electronic device (not shown). Contacts 304 and 306 extend inside chamber 302 and may be soldered to a circuit board of the electronic device (e.g., a flex board or a rigid board). Contacts 304 and 306 are separated such that, in the absence of a conductor between contacts 304 and 306, the electrical circuit formed by contacts 304 and 306 is OPEN.

Chamber 302 may be constructed from any suitable material including, for example, glass, plastic and composite materials. Chamber 302 can be transparent or translucent to permit an operator to view the location and color of fluid in the chamber (e.g., to passively determine whether chamber 302 was subjected to a shock event that exceeded the impact threshold level). To prevent liquid from leaving chamber 302 through the chamber wall at the location where contacts 304 and 306 extend into the chamber, chamber 302 may be constructed such that contacts 304 and 306 are inserted into the chamber wall when portions of the chamber are selectively melted. For example, chamber 302 may be heated to a viscous state and contacts 304 and 306 (e.g., the tips of exposed wires) may be inserted through the viscous chamber wall. When chamber 302 is cooled and becomes solid, contacts 304 and 306 extend securely through the chamber wall.

Contacts 304 and 306 may be any suitable conductive material. For example, contacts 304 and 306 may be constructed from copper, silver, gold, aluminum, nickel, lead, graphite, or any other suitable conductor. Contacts 304 and 306 can be soldered to the circuit board using flux to prevent the formation of metal oxides and to enhance wetting. Fluid 312 of shock sensor 300 (discussed in more detail below) can be selected such that it does not boil at soldering temperatures (e.g., so that it does not boil and cause reservoir 310 or membrane 314 to rupture when contacts 304 and 306 are electrically coupled to a circuit board).

Chamber 302 includes reservoir 310 enclosed within chamber 302 (e.g., attached to the inner surface of chamber 302 at one end of the chamber). Reservoir 310 may at least partially be filled with conductive fluid 312. Fluid 312 may be maintained within reservoir 310 by membrane 314, which may be coupled to tip 311 of chamber 310. Membrane 314 may be constructed to rupture in response to a shock event that exceeded the impact threshold level of shock sensor 300.

In some embodiments, reservoir 310 may be incorporated in chamber 302 such that membrane 314 separates chamber 302 into two sections. Membrane 314 may be coupled to reservoir 310 or to chamber 302 in any suitable manner. For example, an adhesive may be used to attach membrane 314 to reservoir 310. The adhesive may be selected such that it releases membrane 314 when the shock event on the electronic device exceeds the impact threshold level. As another example, membrane 314 may be manufactured as part of reservoir 310 (e.g., molded in the reservoir).

In some embodiments, reservoir 310 can be configured to rupture when the electronic device receives a shock event that exceeds the impact threshold level. In such embodiments, entire reservoir 310 can be constructed as membrane 314. Reservoir 310 and membrane 314 may be formed from any suitable material such that reservoir 310 and membrane 314 are weaker, and therefore will break or separate before chamber 302 breaks. Such materials may include, for example, glass, plastic, composite materials, or any other such materials.

Figure 3B:
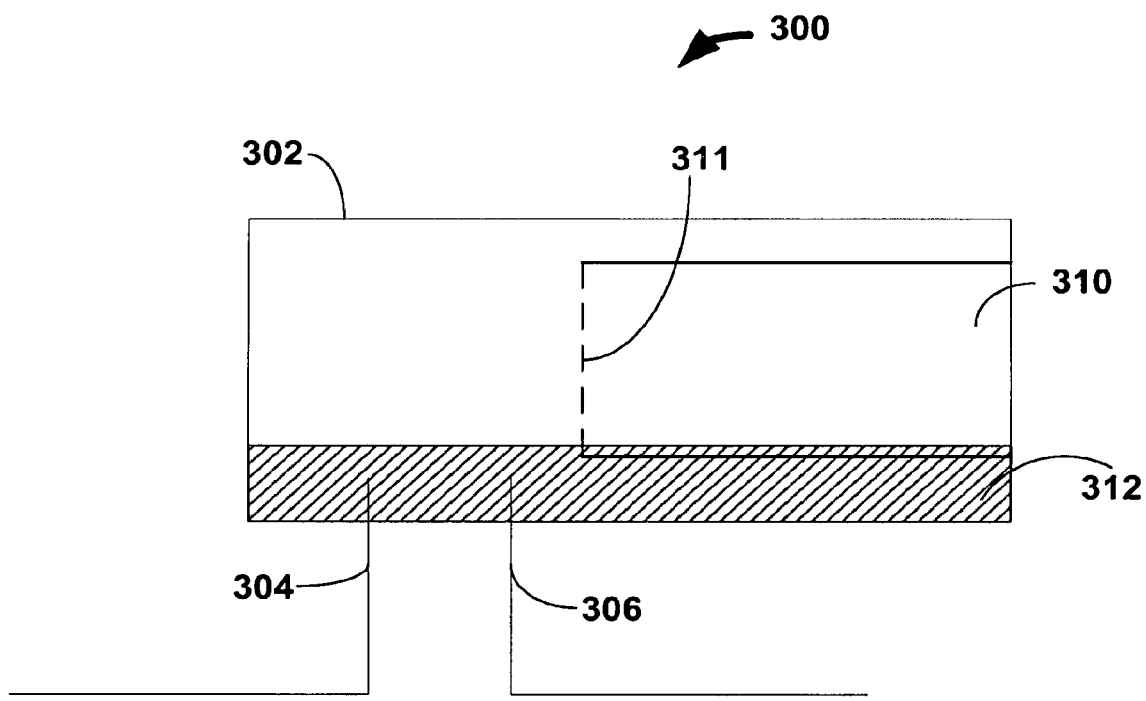
FIG. 3B is a simplified cross-sectional view of the illustrative shock sensor system of FIG. 3A when the electronic device in which the shock event system is implemented is subjected to a shock event that exceeded the impact threshold level of the sensor in accordance with one embodiment of the present invention.

FIG. 3B is a simplified cross-sectional view of the illustrative shock sensor system of FIG. 3A when the electronic device in which the shock event system is implemented is subjected to a shock event that exceeded the impact threshold level of the sensor. When the electronic device is subjected to such a shock event, conductive fluid 312 escapes from reservoir 310 and fills chamber 302. Because conductive fluid 312 is conductive, it closes the electrical circuit between contacts 304 and 306, resulting in transmission of a different electrical signal to detection circuitry.

Membrane 314, reservoir 310, or both may break or separate to allow conductive fluid 312 to fill chamber 310. In the example shown in FIG. 3B, membrane 314 ruptured, and is no longer shown in FIG. 3B. Conductive fluid 312 may be colored such that it may be clearly visible within reservoir 310 or chamber 302.

To set the impact threshold level at which shock sensor 300 allows conductive fluid 312 to short contacts 304 and 306, a number of parameters may be adjusted. These parameters include, for example, the density and volume of conductive fluid 312 in reservoir 310, the diameter of reservoir 310, the strength of membrane 314, the manner in which membrane 314 may be coupled to reservoir 310, the wall thickness of reservoir 310, or any other suitable parameter.

With shock sensor 300, there are two methods for determining whether the electronic device in which the shock sensor was implemented was subjected to a shock event that exceeded the impact threshold level. First, when conductive fluid 312 fills chamber 302, the electrical circuit between contacts 304 and 306 may be closed and an electrical signal may be provided. The electrical signal may be received or identified by a suitable diagnostic device.

If the electronic device is so damaged that it is not able to transmit an electronic signal indicative of shock event status, shock sensor 300 provides passive shock detection for determining whether the electronic device was subjected to a shock event or impact that exceeded the impact threshold level. In some embodiments, the electronic device may need to be opened to observe chamber 302 to determine whether conductive fluid 312 is visible within entire chamber 302 (indicating that shock sensor 300 was subjected to a shock event that exceeded the impact threshold level).

It should be understood that detection of a passive attribute of the shock sensor need not always require that the electronic device be opened or disassembled. In some embodiments, the electronic device may include a transparent part that permits a technician to see chamber 302. In some embodiments, a passive RFID tag may be electrically coupled to contacts 304 and 306. The RFID tag may provide a signal when contacts 304 and 306 are shorted together by, for example, conductive fluid 312. When contacts 304 and 306 are shorted, this short circuit may close a circuit connecting in the RFID tag, thereby enabling the RFID tag to emit a signal (which may indicate that the electronic device has been subject to a shock event that exceeds the impact threshold level) in response to receiving a signal from a RFID detection device. If the RFID detection device does not receive a signal from the RFID tag, this may indicate that the electronic device has not been subject to an excessive shock event. An advantage of using a passive RFID tag may be that it does not require a power source to operate, as it receives power in the signal provided by the RFID detection device. If desired, active RFID tags may be used in lieu of passive RFID tags. It is understood that RFID tags may be used for any shock sensor embodiment described herein.

Figure 4A:
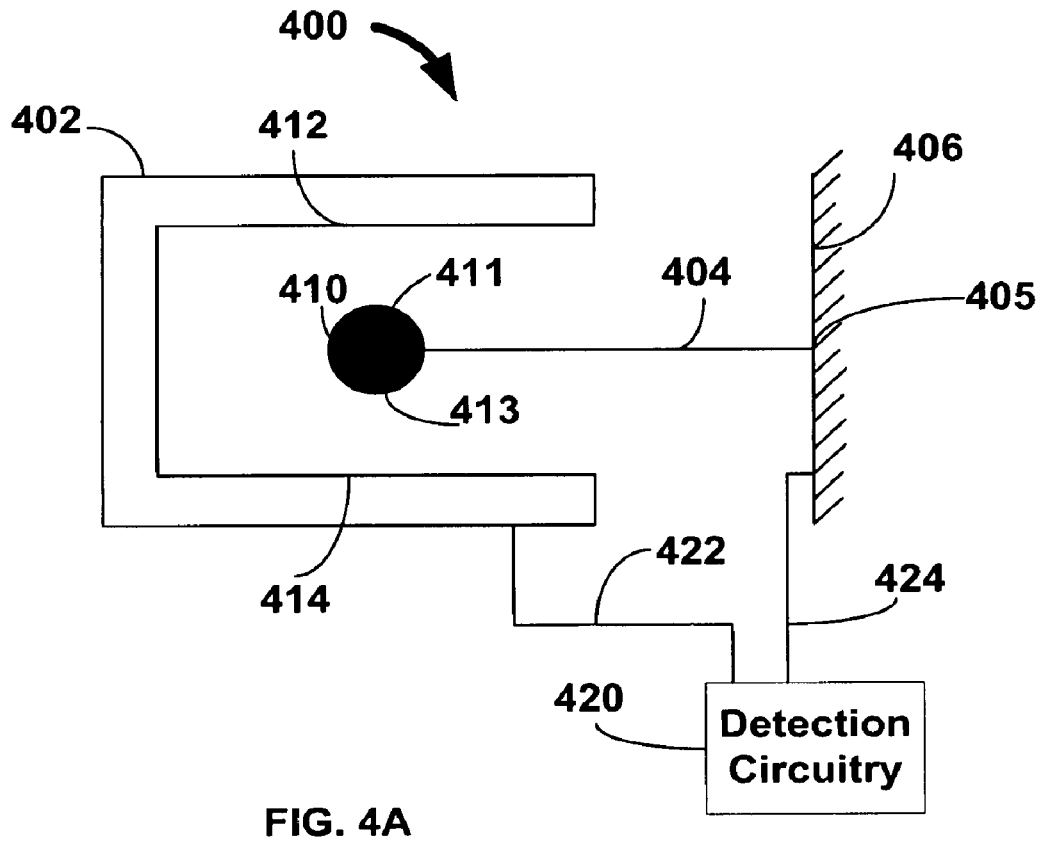
FIG. 4A is a simplified cross-sectional view of another illustrative shock sensor system that incorporates both active and passive attributes in accordance with one embodiment of the present invention.
Figure 4B:
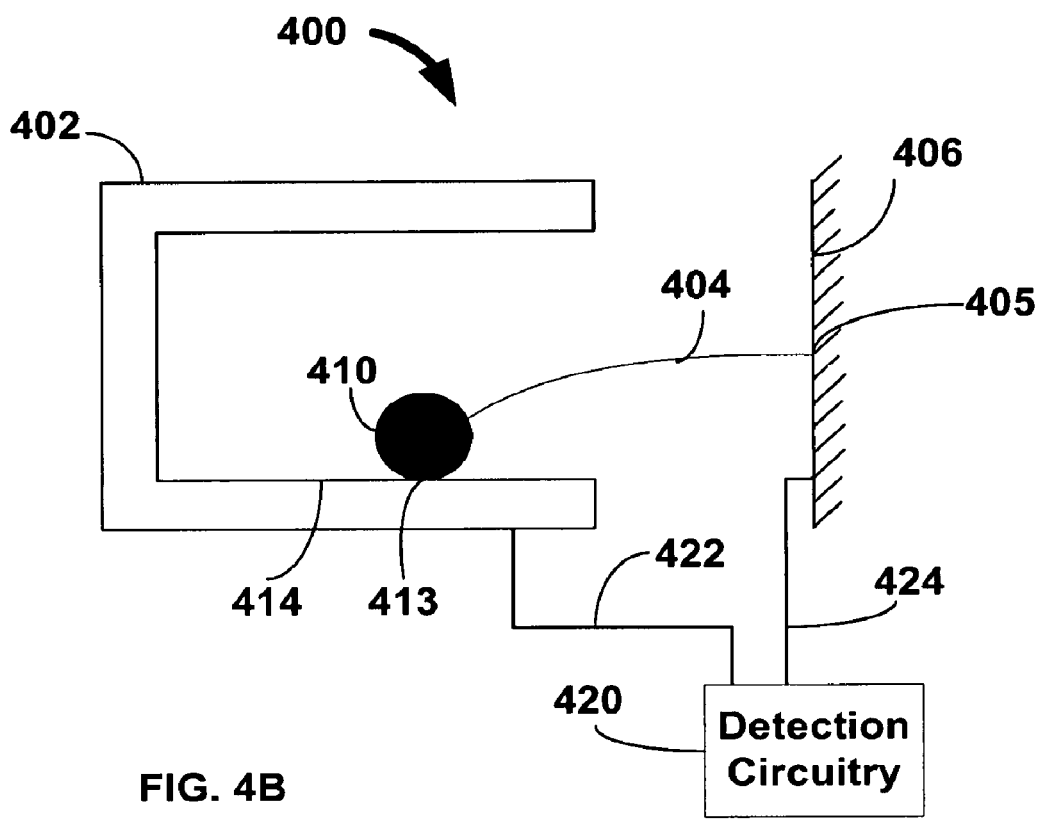
FIG. 4B is a simplified cross-sectional view of the shock sensor system of FIG. 4A when the sensor has been subjected to a shock event that exceeded the impact threshold level in accordance with one embodiment of the present invention.
Figure 4C:
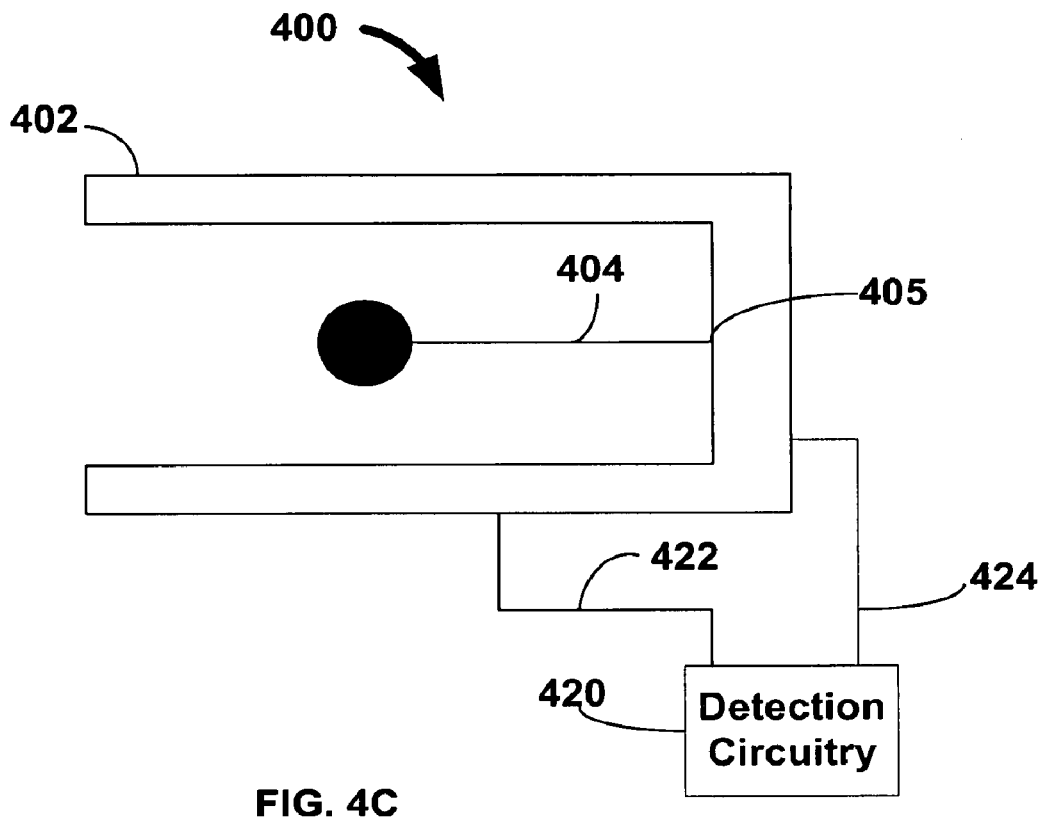
FIG. 4C is a simplified cross-sectional view of another configuration for the illustrative shock sensor system of FIG. 4A in accordance with one embodiment of the present invention.

FIG. 4A is a simplified cross-sectional view of another illustrative shock sensor system that incorporates both active and passive attributes. Shock sensor 400 includes chamber 402 and spring 404. Chamber 402 encloses spring 404 in at least two directions (e.g., up and down, as shown in FIG. 4A). Chamber 402 can be a tubular structure, a rectangular structure (e.g., similar to box 102 of FIG. 1), or any other suitable structure for disposing spring 404 within the structure. In some embodiments, as shown in FIG. 4C, chamber 402 may be coupled to the fixed end of spring 404 at contact point 405 (e.g., the open end of chamber 402 is by the free end of spring 404, and not by the fixed end).

Chamber 402 may be constructed from any suitable material. In particular, chamber 402 may be constructed from an electrically conducting material to transmit electrical signals when shock sensor 400 is subjected to a shock event that exceeded the impact threshold level. Chamber 402 may also be constructed from a material that has magnetic properties. For chamber 402 to exhibit both of these properties, chamber 402 may be constructed from, for example, steel, iron, iron based alloys, or any other material that may be both electrically conductive and magnetic. Other suitable materials may include permanent magnets and electro-magnets.

Spring 404 may be a cantilever spring that may be fixed to shock sensor 400 (or to the electronic device in which shock sensor 400 is implemented) at contact point 405. Contact point 405 may be a point of plate 406 that may be fixed with respect to chamber 402. In some embodiments, contact point 405 may be on chamber 402 (e.g., if chamber 402 extends where plate 406 is shown in FIG. 4A). At its resting position, spring 404 may be configured to be equidistant from each section of chamber 402. In some embodiments, spring 404 and plate 406 may be constructed from electrically conductive material.

Magnet 410 may be coupled to the free tip of spring 404. Magnet 410 may be any suitable magnet, for example a permanent magnet. Magnet 410 may be constructed in any suitable shape. In the example of FIG. 4A, magnet 410 may be spherical. Other suitable shapes may include, for example, cylindrical, polyhedral, trapezoidal, or rectangular.

The polarity of magnet 410 and chamber 402 may be configured such that magnet 410 may be attracted to chamber 402. For example, top portion 411 of magnet 410 may be a north pole, and upper wall 412 may be a south pole such that top portion 411 may be magnetically attracted to upper wall 412. Similarly, bottom portion 413 of magnet 411 may be a south pole, and lower wall 414 may be a north pole such that bottom portion 413 may be magnetically attracted to lower wall 414. The strength of the magnetic attraction between walls 412 and 414 and the portions of magnet 410 may be configured such that magnet 410 remains in an equilibrium position at equal distances from each of upper and lower walls 412 and 414, respectively.

Shock sensor 400 includes shock detection circuitry 420 for transmitting a signal when shock sensor 400 is subjected to a shock event that exceeded the impact threshold level. Circuitry 420 may be electrically coupled to chamber 402 and to plate 406 by paths 422 and 424, respectively. When the circuit between paths 422 and 424 is closed, an electrical signal or a change in a state may be detected by shock detection circuitry 420. Detection circuitry 420 may register or store the occurrence of an excessive shock event so that such information can be provided, for example, to a diagnostic device. In the embodiment of FIG. 4C, circuitry 420 may be electrically coupled by paths 422 and 424 to different portions of chamber 402 that are electrically insulated from each other.

In some embodiments, detection circuitry 420 may transmit an electrical signal continuously or at various intervals in response to determining that the circuit between paths 422 and 424 has been closed. In some embodiments, detection circuitry 420 may change the state of shock sensor 400, for example by changing one or more bits in the memory of detection circuitry 420. In some embodiments, detection circuitry 420 may change the state of the electronic device, for example by changing one or more bits in the memory of the electronic device.

When shock sensor 400 is subjected to a shock event that exceeds the impact threshold level, spring 404 bends and magnet 410 comes into contact with chamber 402. FIG. 4B is a simplified cross-sectional view of the shock sensor system of FIG. 4A when the sensor has been subjected to a shock event that exceeds the impact threshold level.

When bottom magnet 410 comes into contact with chamber 402, the electrical circuit formed by paths 422 and 424 may be closed, and an electrical signal may be transmitted to detection circuitry 420. The electrical signal can be transmitted because all of plate 406, spring 404, magnet 410 and chamber 402 are constructed from electrically conductive materials.

In addition, because bottom portion 413 and lower wall 414 are subject to a magnetic attraction force, magnet 410 remains in contact with chamber 402 after the shock event has dissipated. An external force may be required to release magnet 410 from chamber 402.

The impact threshold level for shock sensor 400 depends on a number of parameters. These parameters include the distance between chamber 402 and magnet 410, the magnetic permeability and magnetic strength of magnet 410 and chamber 402, the spring constant of spring 404, the length of spring 404, the mass of magnet 410, and any other suitable parameter. These parameters may be chosen to define a particular impact threshold level.

With shock sensor 400, there are two methods for determining whether the electronic device in which the shock sensor was implemented was subjected to a shock event that exceeded the impact threshold level. First, when magnet 410 comes into contact with chamber 402, the electrical circuit formed by paths 422 and 424 may be closed, providing an electrical signal that can be received by detection circuitry 420. The electrical signal can then be identified or measured, thus providing the functionality of an active shock sensor.

In addition, shock sensor 400 also exhibits the functionality of a passive shock sensor. If the electronic device is so damaged that a shock event signal is not capable of being read by diagnostic equipment, shock sensor 400 may be observed to determine the location of magnet 410 within chamber 402. In particular, if magnet 410 is in contact with chamber 402, it indicates that shock sensor 400, and therefore the electronic device in which it is implemented, was subjected to a shock event that exceeded the impact threshold level and caused magnet 410 to bend spring 404 so far that magnet 410 came into contact with chamber 402. In some embodiments, a technician may be required to at least in part disassemble the electronic device to view shock sensor 400.

Unlike many purely passive shock sensors, shock sensor 400 may be not a single use sensor. Instead, shock sensor 400 may be reset within the electronic device by returning magnet 410 to its equilibrium position away from chamber 402 and by resetting the state of the electronic device (e.g., resetting the bit in memory that was modified to indicate a shock event that exceeded the impact threshold level).

Figure 5:
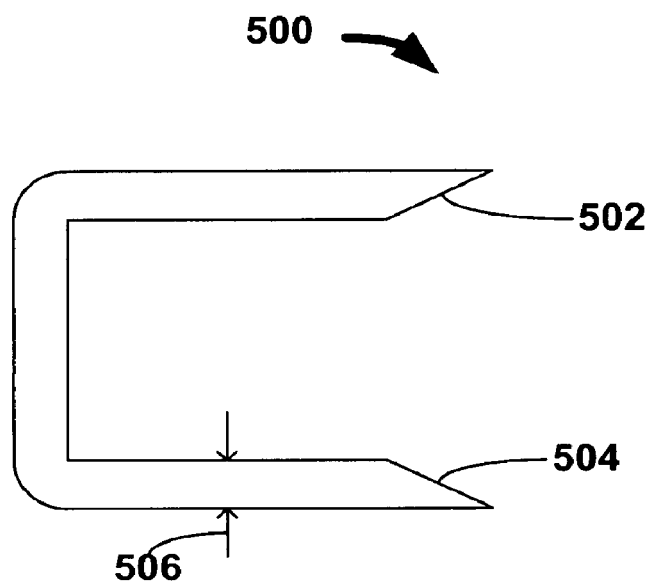
FIG. 5 is a perspective view of a resetting tool for the shock sensor system of FIGS. 4A and 4B in accordance with one embodiment of the present invention.

To reset magnet 410, the technician may use an appropriate tool. FIG. 5 is a perspective view of a resetting tool for the shock sensor system of FIGS. 4A and 4B. Tool 500 may be a U-shaped device that may be configured to fit between chamber 402 and spring 404 (FIG. 4B). Tool 500 includes points 502 and 504 that may be configured to slide between magnet 410 and chamber 402 such that point 502 or 504 separates magnet 410 from chamber 402. Tool 500 may have any suitable thickness 506. In some embodiments, thickness 506 may be selected such that magnet 410 may be released from the magnetic attraction of chamber 402 when magnet 410 is at a distance 506 from the wall.

Tool 500 may be constructed from non-magnetic material to avoid undesired interactions with chamber 402 or magnet 410. A technician may insert tool 500 into shock sensor 400 in any suitable manner. For example, chamber 402 may include a aperture configured to receive points 502 and 504. As another example, tool 500 may be inserted in the space between chamber 402 and plate 406.

Figure 6:
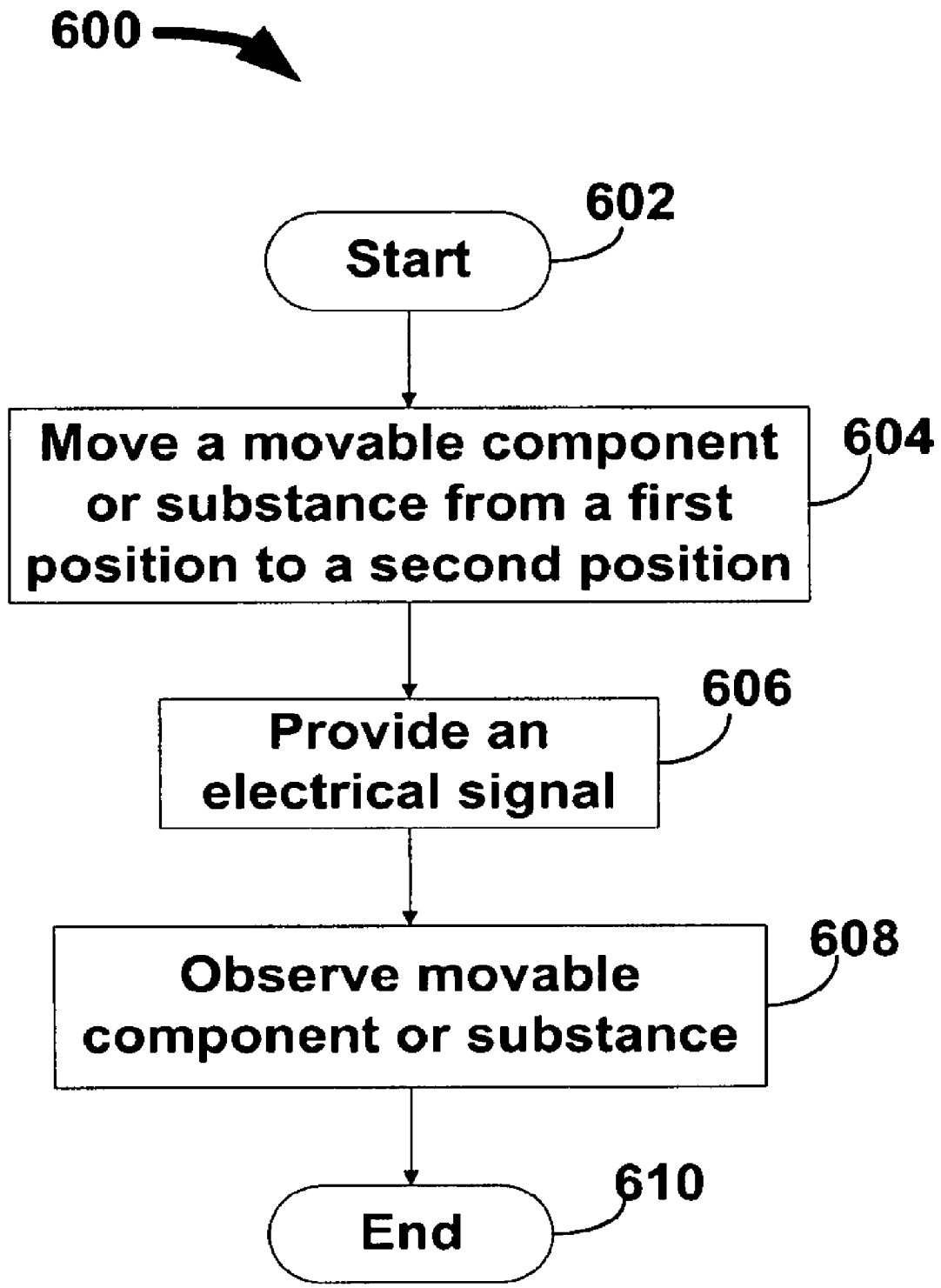
FIG. 6 shows an illustrative flow chart for actively and passively indicating the occurrence of a shock event in accordance with one embodiment of the present invention.

FIG. 6 shows an illustrative flow chart for actively and passively indicating the occurrence of a shock event. Process 600 begins at step 602. At step 604, the movable component or substance of a shock sensor moves from a first position to a second position. For example, the movable component or substance may move to a second position in response to a shock event that exceeds an impact threshold level of the shock sensor. The movable component or substance may include, for example, conductive fluid retained within a chamber, or a cantilever spring with a magnet enclosed by a chamber.

At step 606, detection circuitry of the shock sensor provides an electrical signal. For example, the detection circuitry may monitor the movable component or substance, and provide an electrical signal in response to the movable component or substance moving to the second position. In some embodiments, the detection circuitry may monitor shock detection contacts that are configured to be short circuited by the movable component or substance when it is in the second position. The electrical signal may be continuously or intermittently provided for detection by a diagnosis device. Alternatively or in addition, the electrical signal may cause the shock sensor or an electronic device in which the shock sensor is implemented to change its state (e.g., change one or more bits in memory). The diagnosis device may then be configured to detect the change in state. The electrical signal or of its effect may be used to actively detect the occurrence of shock events.

At step 608, a technician observes the movable component or substance. For example, the technician may observe whether the movable component or substance is in the second position, passively indicating the occurrence of a shock event. The movable component or substance may be configured to remain in the second position after a substantial shock event to provide passive detection of shock events. In some embodiments, the technician may be required to disassemble the electronic device in which the shock sensor is implemented to observe the movable component or substance. Process 600 then ends at step 610.

Figure 7:
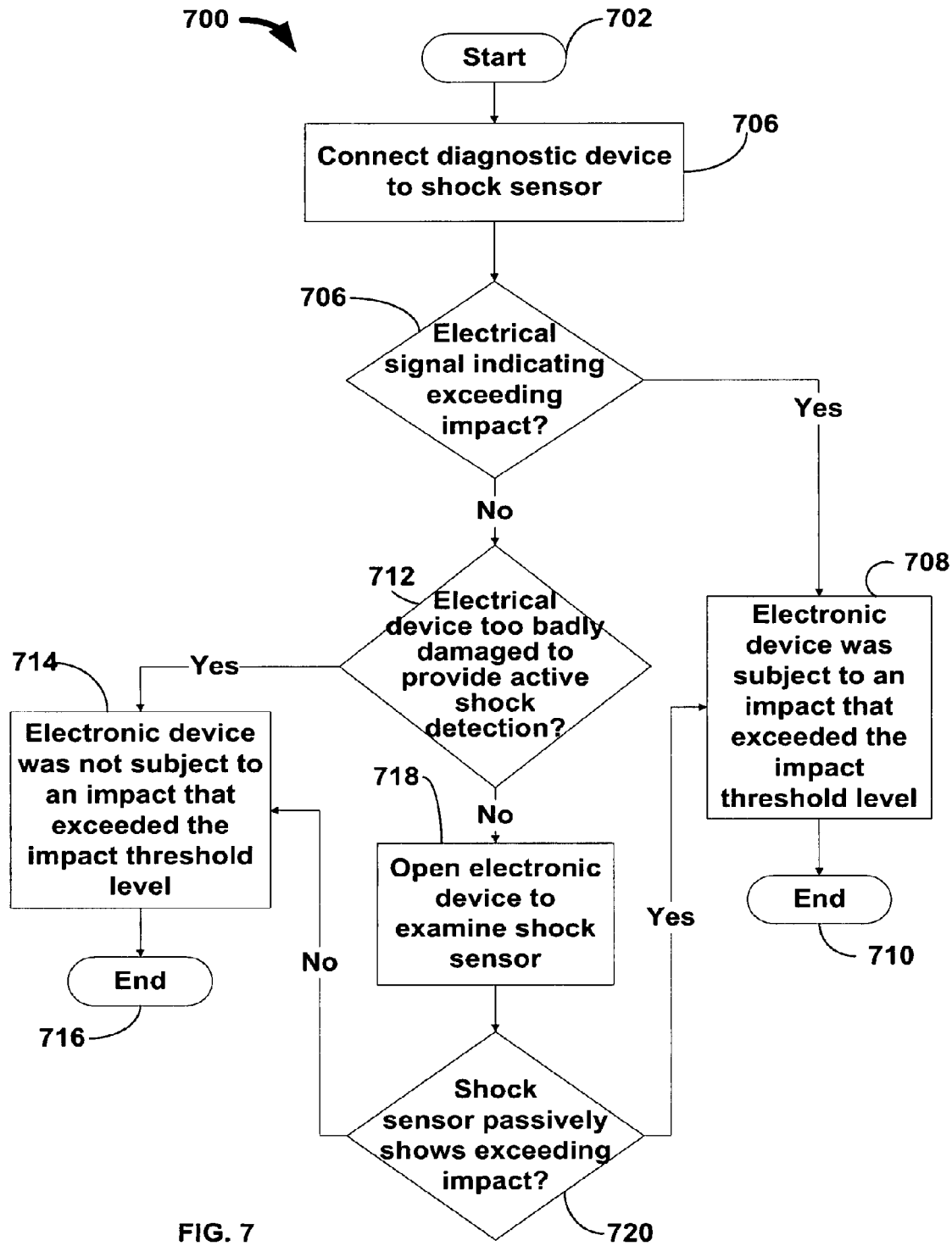
FIG. 7 shows an illustrative flow chart of a process for determining whether an electronic device in which a shock sensor system has been implemented has been subjected to a shock event that exceeded the impact threshold level for the device in accordance with one embodiment of the present invention.

FIG. 7 shows an illustrative flow chart of a process for determining whether an electronic device in which a shock sensor system has been implemented has been subjected to a shock event that exceeded the impact threshold level for the device. Process 700 begins at step 702. At step 704, a technician connects a diagnostic device to an electronic device including an active/passive shock sensor according to an embodiment of the invention. The diagnostic device may check paths 302 and 304 (FIG. 3A) or paths 420 and 422 (FIG. 4A). At step 706, the diagnostic device determines whether an electrical signal indicating that a shock event exceeding the impact threshold level is present. For example, the diagnostic device may detect an electrical signal or the detection circuitry may identify a change of state of the electronic device (e.g., a bit changed in memory). The electrical signal may be transmitted because a movable component or substance of the shock sensor closed the electrical circuit between the shock sensor cables. This is an examination of the active feature of the shock sensor. If the detection circuitry detects an electrical signal, process 700 moves to step 708.

At step 708, the technician determines, based on the presence of the electrical signal, that the electronic device was subjected to a shock event that exceeded the impact threshold level. Process 700 then ends at step 710.

If, at step 706, the detection circuitry instead does not detect an electrical signal, process 700 moves to step 712. At step 712, the technician determines whether the electronic device is too badly damaged to provide active shock detection. For example, the technician may determine whether the device powers up. As another example, the technician may determine whether individual components of the electronic device are operating when provided with power. If the technician determines that the electronic device is not too badly damaged to provide active shock detection, process 700 moves to step 714.

At step 714, the technician determines, based on the absence of the electrical signal and on the powering up of the electronic device, that the electronic device was not subjected to a shock event that exceeded the impact threshold level. Process 700 then ends at step 716.

If, at step 712, the technician instead determines that the electronic device is too badly damaged to provide active shock detection, process 700 moves to step 718. At step 718, the technician opens the electronic device to examine the shock sensor. This is an examination of the passive aspect of the shock sensor. At step 720, the technician determines whether the shock sensor passively indicates that the electronic device was subjected to a shock event that exceeded the impact threshold level. To do so, the technician may determine whether a movable component or substance of the shock sensor moved from a first position to a second position. For example, the technician may determine whether fluid 312 is present in chamber 302 (FIG. 3B). As another example, the technician may determine whether magnet 410 is in contact with chamber 402 (FIG. 4B). If the technician determines that the shock sensor does not passively indicate that the electronic device was subjected to an exceedingly high shock event, process 700 moves to step 714.

If, at step 720, the technician instead determines that the shock sensor passively indicates that the electronic device was subjected to an exceeding shock event, process 700 moves to step 708. In some embodiments, after step 708, process 700 may include a step for resetting the shock sensor. For example, the technician may return magnet 410 to its equilibrium position away from chamber 402 (FIGS. 4A, 5). Process 700 then ends.

The above described embodiments of the present invention are presented for purposes of illustration and not of limitation, and the present invention is limited only by the claims which follow.

What is claimed is:

1. A shock sensor for actively and passively indicating the occurrence of a shock event, comprising:
a component operative to move from a first position to a second position in response to a shock event, wherein:
the component, when in the second position, changes a state of an electrical circuit to provide an active indication of the shock event; and
the component can be observed in the second position to provide a passive indication of the shock event.

2. The shock sensor of claim 1, wherein:
the shock sensor is coupled to a circuit board.

3. The shock sensor of claim 2, wherein,
the circuit board comprises the electrical circuit, wherein the electrical circuit comprises terminals to which a detection tool can connect to determine the state of the electrical circuit.

4. The shock sensor of claim 1, wherein:
the component comprises a conductive liquid.

5. The shock sensor of claim 4, wherein:
the liquid is colored.

6. The shock sensor of claim 1, wherein:
the component comprises a magnet.

7. The shock sensor of claim 1, wherein:
the component changes the state of the electrical circuit from an open state to a closed state.

8. The shock sensor of claim 1, wherein:
the component moves from the first position to the second position in response to being subject to a shock event that exceeds a threshold level for the shock sensor.

9. The shock sensor of claim 1, further comprising:
an RFID tag operative to emit a signal in response to the component moving from the first position to the second position.

10. A method for actively and passively indicating the occurrence of a shock event using a single shock sensor, comprising:
providing an electrical signal for actively indicating the occurrence of a shock event; and
providing an observable component for passively indicating the occurrence of the shock event.

11. The method of claim 10, further comprising:
moving the observable component from a first position to a second position, wherein the observable component is observed in the second position for passively indicating the occurrence of the shock event.

12. The method of claim 11, further comprising:
moving an electrical component from a first position to a second position, wherein the electrical component is operative to provide an electrical signal in the second position.

13. The method of claim 12, wherein:
the observable component and the electrical component are the same.

14. The method of claim 13, wherein:
the observable component comprises a fluid placed within a reservoir.

15. The method of claim 13, wherein:
the observable component comprises a magnet.

16. A system for actively and passively indicating the occurrence of a shock event, comprising:
an electronic device; and
a shock sensor coupled to the electronic device, wherein the shock sensor further comprises:
an electrical circuit; and
a movable component movable between a first position and a second position wherein, in response to a shock event, the movable component moves to the second position and changes a state of the electrical circuit to provide active shock detection and the movable component is observed in the second position to provide passive shock detection.

17. The system of claim 16, wherein:
the electrical circuit is in a closed state when the moveable component is in the second position.

18. The system of claim 16, further comprising:
a diagnostic device selectively coupled to the electrical circuit and operative to detect the change in state of the electrical circuit.

19. The system of claim 16, further comprising:
storage operative to store the state of the electrical circuit.

20. The system of claim 16, further comprising:
a RFID tag operative to emit a signal when the movable component is in the second position.

* * * * *